(12) United States Patent
Lee et al.

(10) Patent No.: US 11,651,901 B2
(45) Date of Patent: May 16, 2023

(54) MULTILAYER ELECTRONIC COMPONENT

(71) Applicant: SAMSUNG ELECTRO-MECHANICS CO., LTD., Suwon-si (KR)

(72) Inventors: Il Ro Lee, Suwon-si (KR); Jung Min Kim, Suwon-si (KR); Hong Je Choi, Suwon-si (KR); Sang Wook Lee, Suwon-si (KR); Seon Ho Park, Suwon-si (KR); Jeong Ryeol Kim, Suwon-si (KR); Bon Seok Koo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/462,726

(22) Filed: Aug. 31, 2021

(65) Prior Publication Data

US 2022/0165500 A1    May 26, 2022

(30) Foreign Application Priority Data

Nov. 23, 2020   (KR) .................. 10-2020-0157986

(51) Int. Cl.
*H01G 4/30* (2006.01)
*H01G 4/012* (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01); *H01G 4/1227* (2013.01)

(58) Field of Classification Search
CPC ........ H01G 2/065; H01G 4/008; H01G 4/012; H01G 4/1227; H01G 4/232; H01G 4/2325; H01G 4/252; H01G 4/30
See application file for complete search history.

(56) References Cited

U.S. PATENT DOCUMENTS

| 2011/0051314 A1 | 3/2011 | Sakurai et al. |
| 2015/0279566 A1 | 10/2015 | Otani |

(Continued)

FOREIGN PATENT DOCUMENTS

| JP | 2011-54642 A | 3/2011 |
| JP | WO2014/097823 A1 | 6/2014 |
| KR | 10-2020-0064860 A | 6/2020 |

*Primary Examiner* — Nathan Milakovich

(74) *Attorney, Agent, or Firm* — Morgan, Lewis & Bockius LLP

(57) ABSTRACT

A multilayer electronic component includes: a body including dielectric layers and internal electrodes disposed alternately with the dielectric layers; and external electrodes disposed on the body, wherein each of the external electrodes includes: an electrode layer connected to the internal electrodes; a first intermetallic compound layer disposed on the electrode layer and including $Cu_3Sn$; a second intermetallic compound layer disposed on the first intermetallic compound layer and including $Cu_6Sn_5$; and a conductive resin layer disposed on the second intermetallic compound layer and including a conductive connection portion including a low melting point metal, a plurality of metal particles, and a base resin, and an average thickness of the first intermetallic compound layer is 0.5 to 2.5 μm.

20 Claims, 9 Drawing Sheets

(51) Int. Cl.
*H01G 2/06* (2006.01)
*H01G 4/12* (2006.01)
*H01G 4/008* (2006.01)

(56) References Cited

U.S. PATENT DOCUMENTS

| | | | |
|---|---|---|---|
| 2017/0301468 A1* | 10/2017 | Kim | H01G 4/2325 |
| 2018/0033540 A1* | 2/2018 | Lee | H01F 27/292 |
| 2018/0234074 A1* | 8/2018 | Lee | H01F 3/10 |
| 2019/0122810 A1* | 4/2019 | Oh | H01F 17/0013 |
| 2020/0176189 A1* | 6/2020 | Koo | H01G 4/2325 |

\* cited by examiner

MULTILAYER ELECTRONIC COMPONENT

CROSS-REFERENCE TO RELATED APPLICATION(S)

This application claims benefit of priority to Korean Patent Application No. 10-2020-0157986 filed on Nov. 23, 2020 in the Korean Intellectual Property Office, the disclosure of which is incorporated herein by reference in its entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on a printed circuit boards of several electronic products such as an image display device, for example, a liquid crystal display (LCD), a plasma display panel (PDP) or the like, a computer, a smartphone, a mobile phone, and the like, to serve to charge or discharge electricity therein or therefrom.

The multilayer ceramic capacitor may be used as a component of various electronic apparatuses since it has a small size, implements high capacitance, and may be easily mounted. Recently, in accordance with the miniaturization and improvement of performance of electronic devices, a multilayer ceramic capacitor has tended to be miniaturized and capacitance of the multilayer ceramic capacitor has tended to be increased. In accordance with such a trend, it has become important to secure high reliability in a multilayer ceramic capacitor.

As a method for securing the high reliability of the multilayer ceramic capacitor, a technology of using conductive resin layers in external electrodes in order to absorb tensile stress generated in a mechanical or thermal environment to prevent generation of a crack due to the tensile stress has been disclosed.

Such conductive resin layers serve to electrically and mechanically bond fired electrode layers and plating layers of the external electrodes of the multilayer ceramic capacitor to each other, and further serve to protect the multilayer ceramic capacitor from mechanical and thermal stress depending on a process temperature and a warpage impact of a circuit board at the time of mounting the multilayer ceramic capacitor on the circuit board.

However, the conductive resin layers have high resistance, such that equivalent series resistance (ESR) is higher than that of a product that does not include the conductive resin layers.

In addition, the fired electrode layers and the conductive resin layers are bonded to each other by a bonding force of a resin, and the bonding force is thus weak. In particular, delamination may occur on interfaces between the fired electrode layers and the conductive resin layers due to outgas generated in the conductive resin layers in a high-temperature environment such as reflow.

SUMMARY

An aspect of the present disclosure may provide a multilayer electronic component having improved reliability.

Another aspect of the present disclosure may provide a multilayer electronic component having decreased equivalent series resistance (ESR).

Another aspect of the present disclosure may provide a multilayer electronic component in which the occurrence of delamination on interfaces between fired electrode layers and conductive resin layers due to outgassing of gas generated in the conductive resin layers in a high-temperature environment such as reflow may be suppressed.

According to an aspect of the present disclosure, a multilayer electronic component may include: a body including dielectric layers and internal electrodes disposed alternately with the dielectric layers; and external electrodes disposed on the body, wherein each of the external electrodes includes: an electrode layer connected to the internal electrodes; a first intermetallic compound layer disposed on the electrode layer and including $Cu_3Sn$; a second intermetallic compound layer disposed on the first intermetallic compound layer and including $Cu_6Sn_5$; and a conductive resin layer disposed on the second intermetallic compound layer and including a conductive connection portion including a low melting point metal, a plurality of metal particles, and a base resin, and an average thickness of the first intermetallic compound layer is 0.5 to 2.5 µm.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
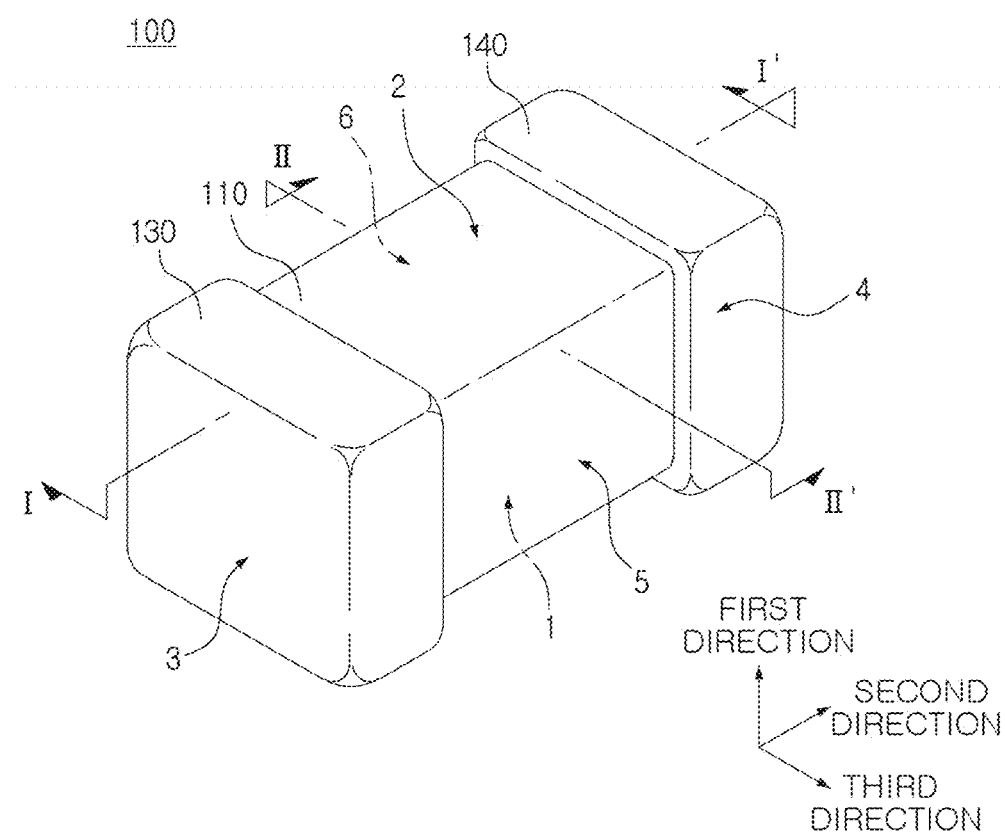
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

In the drawings, a first direction may be defined as a stacked direction or a thickness T direction, a second direction may be defined as a length L direction, and a third direction may be defined as a width W direction.

Multilayer Electronic Component

FIG. 1 is a schematic perspective view illustrating a multilayer electronic component according to an exemplary embodiment in the present disclosure.

Figure 2:
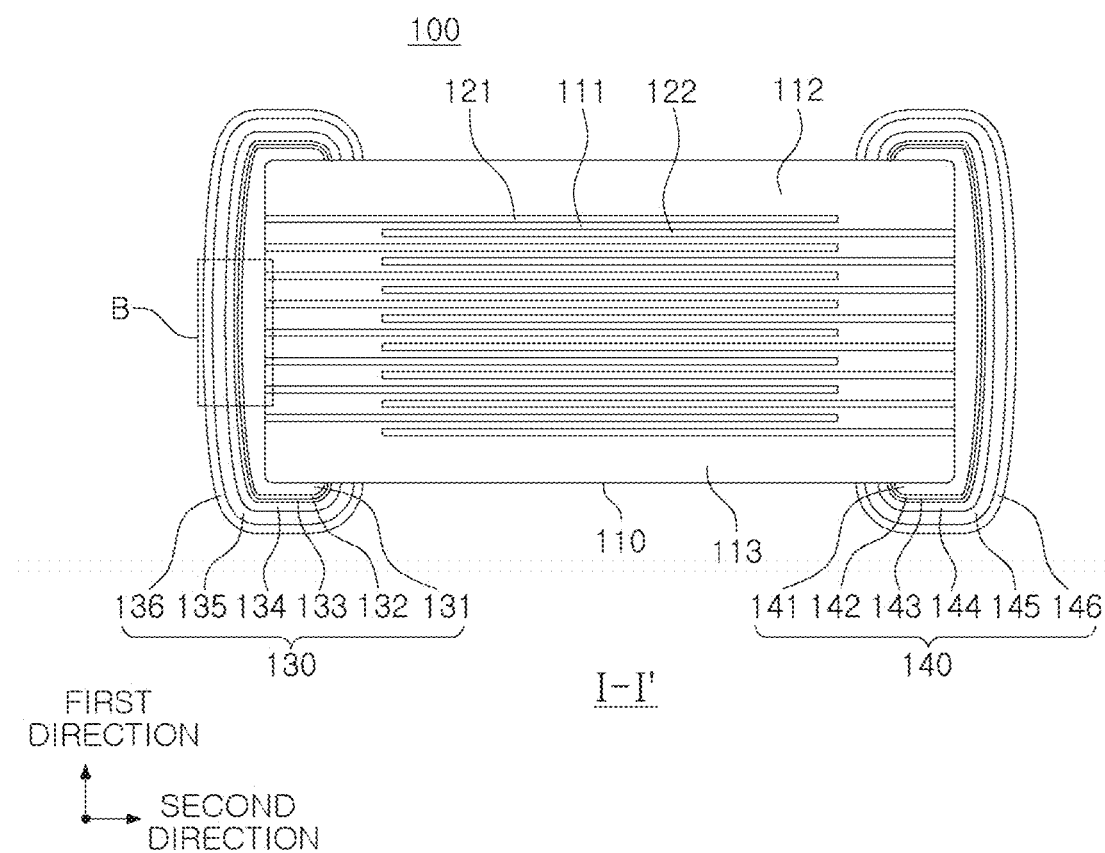
FIG. 2 is a schematic cross-sectional view taken along line I-I' of FIG. 1.

FIG. 2 is a schematic cross-sectional view taken along line I-I' of FIG. 1.

Figure 3:
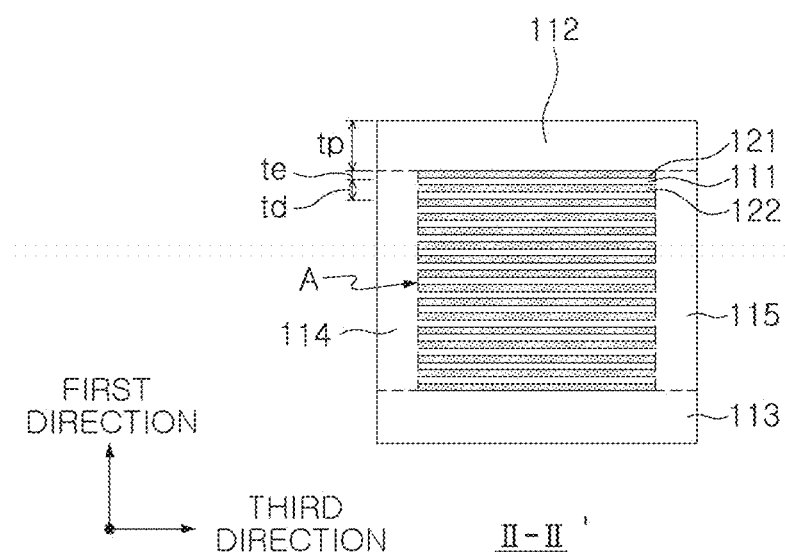
FIG. 3 is a schematic cross-sectional view taken along line II-II' of FIG. 1.

FIG. 3 is a schematic cross-sectional view taken along line II-II' of FIG. 1.

Figure 4:
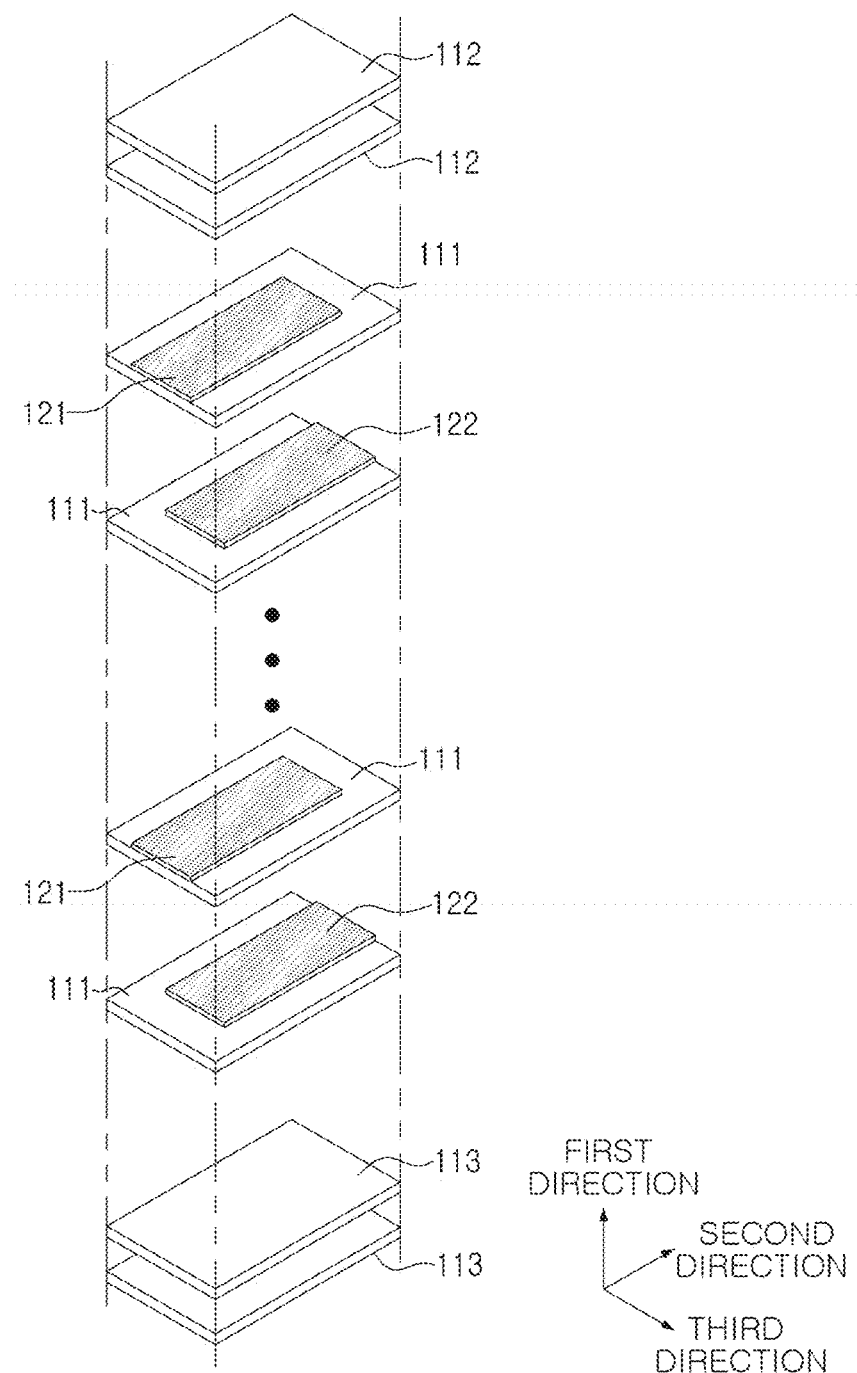
FIG. 4 is a schematic exploded perspective view illustrating a body in which dielectric layers and internal electrodes are stacked according to an exemplary embodiment in the present disclosure.

FIG. 4 is a schematic exploded perspective view illustrating a body in which dielectric layers and internal electrodes are stacked according to an exemplary embodiment in the present disclosure.

Figure 5:
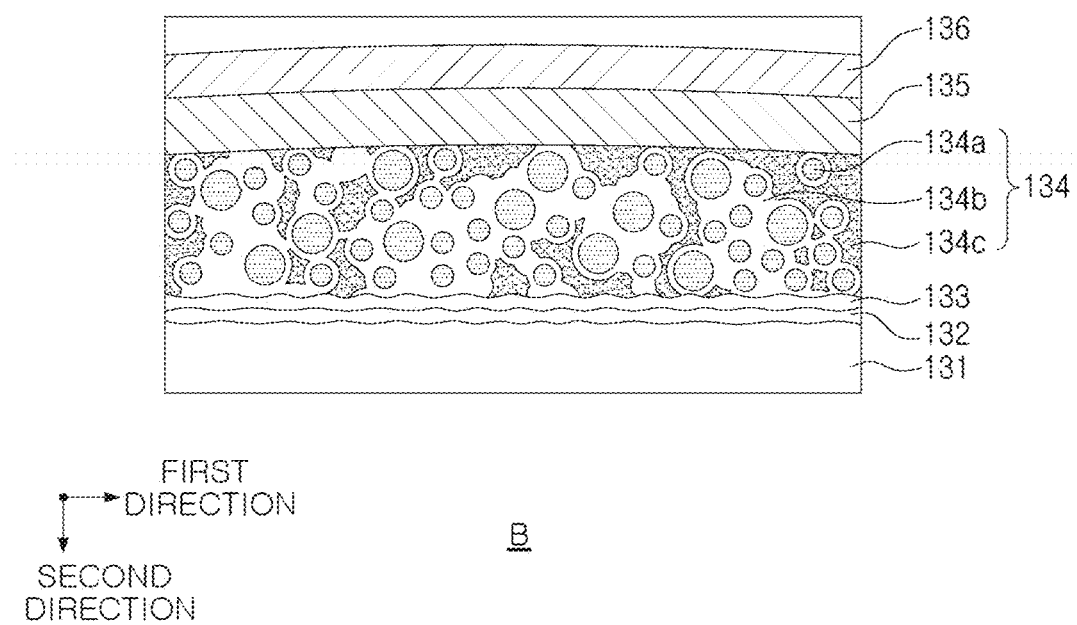
FIG. 5 is an enlarged view of region B of FIG. 2.

FIG. 5 is an enlarged view of region B of FIG. 2.

Figure 6:
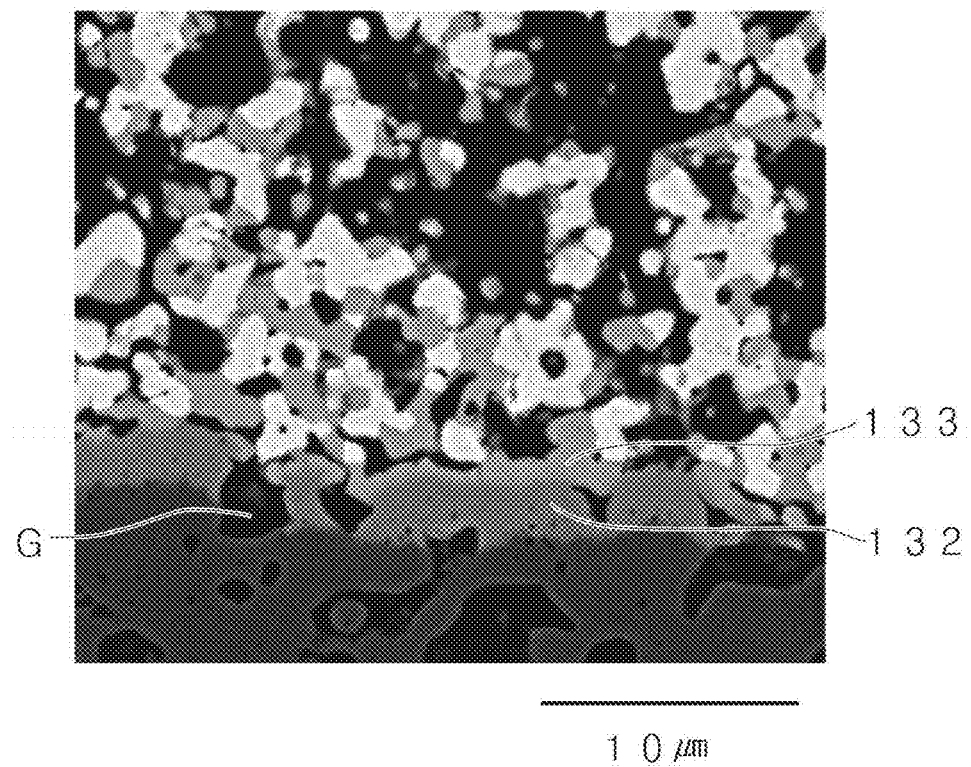
FIG. 6 is an image, captured by a scanning electron microscope (SEM), of a cross section in the vicinity of region B in the multilayer electronic component according to an exemplary embodiment in the present disclosure.

FIG. 6 is an image, captured by a scanning electron microscope (SEM), of a cross section in the vicinity of region B in the multilayer electronic component according to an exemplary embodiment in the present disclosure.

Hereinafter, a multilayer electronic component according to an exemplary embodiment in the present disclosure will be described in detail with reference to FIGS. 1 through 6.

A multilayer electronic component 100 according to an exemplary embodiment in the present disclosure may include a body 110 including dielectric layers 111 and internal electrodes 121 and 122 disposed alternately with the dielectric layers; and external electrodes 130 and 140 disposed on the body, wherein the external electrodes include, respectively, electrode layers 131 and 141 connected to the internal electrodes, respectively; first intermetallic compound layers 132 and 142 disposed on the electrode layers, respectively, and including $Cu_3Sn$; second intermetallic compound layers 133 and 143 disposed on the first intermetallic compound layers, respectively, and including $Cu_6Sn_5$; and conductive resin layers 134 and 144 disposed on the second intermetallic compound layers, respectively, and including: a conductive connection portion 134b including a low melting point metal; a plurality of metal particles 134a; and a base resin 134c; and an average thickness of the first intermetallic compound layers is 0.5 to 2.5 μm.

The body 110 may include the dielectric layers 111 and the internal electrodes 121 and 122 alternately stacked therein.

A shape of the body 110 is not particularly limited, and may be a hexahedral shape or a shape similar to the hexahedral shape, as illustrated in the drawings. Although the body 110 does not have a hexahedral shape having perfectly straight lines due to shrinkage of ceramic powder particles included in the body 110 in a sintering process, the body 110 may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

A plurality of dielectric layers 111 forming the body 110 may be in a sintered state, and adjacent dielectric layers 111 may be integrated with each other so that boundaries therebetween are not readily apparent without using a scanning electron microscope (SEM).

According to an exemplary embodiment in the present disclosure, a raw material of the dielectric layer 111 is not particularly limited as long as sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powder particles. Examples of the $BaTiO_3$-based ceramic powder particles may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1 and 0<y<1), $Ba(Ti_{1-y}Zr_y)O_3$ (0<y<1), or the like, in which calcium (Ca), zirconium (Zr), or the like, is partially solid-dissolved in $BaTiO_3$.

A material of the dielectric layer 111 may include various ceramic additives, organic solvents, binders, dispersants, and the like, added to powder particles such as barium titanate ($BaTiO_3$) powder particles, or the like, according to an object of the present disclosure.

The body 110 may include a capacitance forming portion A disposed in the body 110 and forming capacitance by including first internal electrodes 121 and second internal electrodes 122 disposed to face each other with each of the dielectric layers 111 interposed therebetween and cover portions 112 and 113 formed on upper and lower surfaces of the capacitance forming portion A, respectively.

The capacitance forming portion A, which contributes to forming capacitance of a multilayer capacitor, may be formed by repeatedly stacking a plurality of first and second internal electrodes 121 and 122 with each of the dielectric layers 111 interposed therebetween.

The upper cover portion 112 and the lower cover portion 113 may be formed by stacking a single dielectric layer or two or more dielectric layers on the upper and lower surfaces of the capacitance forming portion A, respectively, in the thickness direction, and may basically serve to prevent damage to the internal electrodes due to physical or chemical stress.

The upper cover portion 112 and the lower cover portion 113 may not include the internal electrodes, and may include the same material as the dielectric layer 111.

That is, the upper cover portion 112 and the lower cover portion 113 may include a ceramic material such as a barium titanate ($BaTiO_3$)-based ceramic material.

In addition, margin portions 114 and 115 may be disposed on side surfaces of the capacitance forming portion A.

The margin portions 114 and 115 may include a margin portion 114 disposed on the sixth surface 6 of the body 110 and a margin portion 115 disposed on the fifth surface 5. That is, the margin portions 114 and 115 may be disposed on opposite side surfaces of the ceramic body 110 in the width direction.

The margin portions 114 and 115 refer to regions between both distal ends of the first and second internal electrodes 121 and 122 and boundary surfaces of the body 110 in a cross section of the body 110 cut in the first and third directions (width-thickness direction), as illustrated in FIG. 3.

The margin portions 114 and 115 may basically serve to prevent damage to the internal electrodes due to physical or chemical stress.

The margin portions 114 and 115 may be formed by applying a conductive paste onto ceramic green sheets except for places where the margin portions are to be formed.

Alternatively, in order to suppress a step due to the internal electrodes 121 and 122, the margin portions 114 and 115 may be formed by stacking ceramic green sheets to form a laminate, cutting the laminate so that the internal electrodes are exposed to the fifth and sixth surfaces 5 and 6 of the body, and then stacking a single dielectric layer or two or more dielectric layers on opposite side surfaces of the capacitance forming portion A in the width direction.

The internal electrodes 121 and 122 may be disposed alternately with the dielectric layer 111.

The internal electrodes may include first and second internal electrodes 121 and 122. The first and second internal electrodes 121 and 122 may be alternately disposed to face each other with each of the dielectric layers 111 constituting the body 110 interposed therebetween, and may be exposed to the third and fourth surfaces 3 and 4 of the body 110, respectively.

Referring to FIG. 2, the first internal electrode 121 may be spaced apart from the fourth surface 4 and be exposed through the third surface 3, and the second internal electrode 122 may be spaced apart from the third surface 3 and be exposed through the fourth surface 4.

In this case, the first and second internal electrodes 121 and 122 may be electrically separated from each other by each of the dielectric layers 111 disposed therebetween.

Referring to FIG. 4, the body 110 may be formed by alternately stacking ceramic green sheets on which the first internal electrode 121 is printed and ceramic green sheets on which the second internal electrode 122 is printed and then sintering the stacked ceramic green sheets.

A conductive metal included in each of the internal electrodes 121 and 122 may include one or more selected from the group consisting of nickel (Ni), copper (Cu), palladium (Pd), silver (Ag), gold (Au), platinum (Pt), tin (Sn), tungsten (W), titanium (Ti), and alloys thereof, but is not limited thereto.

In addition, the internal electrodes 121 and 122 may be formed by printing a conductive paste on the ceramic green sheets, and a method of printing the conductive paste for an internal electrode may be a screen-printing method, a gravure printing method or the like.

According to an exemplary embodiment in the present disclosure, the external electrodes 130 and 140 may include, respectively, the electrode layers 131 and 141 connected to the internal electrodes 121 and 122; the first intermetallic compound layers 132 and 142 disposed on the electrode layers and including $Cu_3Sn$; the second intermetallic compound layers 133 and 143 disposed on the first intermetallic compound layers and including $Cu_6Sn_5$; and the conductive resin layers 134 and 144 disposed on the second intermetallic compound layers and including the conductive connection portion 134b including the low melting point metal, the plurality of metal particles 134a, and the base resin 134c.

FIG. 5 is an enlarged view of region B of FIG. 2.

An enlarged view of a part of the first external electrode 130 is illustrated in the region B, and a description will hereinafter be provided in relation to the first external electrode 130. However, this description may be considered as including a description for the second external electrode 140 since configurations of the first external electrode 130 and the second external electrode 140 are similar to each other except that the first external electrode 130 is electrically connected to the first internal electrodes 121 and the second external electrode 140 is connected to the second internal electrodes 122.

The electrode layers 131 and 141 may serve to mechanically bond the body and the external electrodes to each other, and may further serve to electrically and mechanically bond the internal electrodes and the external electrodes to each other.

The electrode layers 131 and 141 may be in contact with and be directly connected to the first and second internal electrodes 121 and 122 alternately exposed through opposite surfaces of the body 110 in the length direction, respectively, to secure electrical conduction between the first and second external electrodes 130 and 140 and the first and second internal electrodes 121 and 122, respectively.

That is, the electrode layers 131 and 141 may include a first electrode layer 131 and a second electrode layer 141. Here, the first electrode layer 131 may be in contact with and be directly connected to the first internal electrodes 121 exposed through one surface of the body 110 in the length direction to secure electrical conduction between the first external electrodes 130 and the first internal electrodes 121.

In addition, the second electrode layer 141 may be in contact with and be directly connected to the second internal electrodes 122 exposed through the other surface of the body 110 in the length direction to secure electrical conduction between the second external electrodes 140 and the second internal electrodes 122.

Each of these electrode layers 131 and 141 may include a metal component, and examples of the metal component may include nickel (Ni), copper (Cu), palladium (Pd), gold (Au), or alloys thereof. More preferably, fired copper may be used as the metal component.

Meanwhile, a thickness of the electrode layer is not particularly limited, and may be 0.5 to 5 µm.

In this case, the electrode layers 131 and 141 may extend from the third and fourth surfaces 3 and 4 of the body 110 to parts of the first and second surfaces 1 and 2 of the body 110, respectively.

In addition, the electrode layers 131 and 141 may extend from the third and fourth surfaces 3 and 4 of the body 110 to parts of the fifth and sixth surfaces 5 and 6 of the body 110, respectively.

The first intermetallic compound layers 132 and 142 may be disposed on the electrode layers 131 and 141, respectively, and include $Cu_3Sn$.

The first intermetallic compound layers 132 and 142 may serve to improve reliability and electrical connectivity. The first intermetallic compound layers 132 and 142 may be disposed to cover the electrode layers 131 and 141, respectively.

According to an exemplary embodiment in the present disclosure, the external electrodes 130 and 140 may be formed by forming the electrode layers 131 and 141, applying a paste including a low melting point metal onto the electrode layers 131 and 141, and then sintering the electrode layers 131 and 141 to which the low melting point paste is applied. A melting point of the low melting point metal may be 300□ or less.

Therefore, first intermetallic compound layers may be formed by mutual diffusion between metal particles included in the electrode layers 131 and 141 and low melting point metal particles included in the paste used for forming the conductive resin layers 134 and 144, and may be disposed in a layer form between the electrode layers 131 and 141 and the conductive resin layers 134 and 144 to form the first intermetallic compound layers 132 and 142.

Here, the first intermetallic compound layers may include $Cu_3Sn$. That is, $Cu_3Sn$ may be formed by bonding Cu particles, which are the metal particles included in the electrode layers 131 and 141, and Sn particles, which are the low melting point metal particles included in the paste used for forming the conductive resin layers 134 and 144, to each other.

The reliability and the electrical connectivity may be improved due to the first intermetallic compound layers 132 and 142.

It has been known that intermetallic compound layers including $Cu_3Sn$ are formed when conductive resin layers including copper (Cu), tin (Sn), and an epoxy resin are formed on electrode layers including fired copper as in the related art.

However, when only one layer including $Cu_3Sn$ is formed as intermetallic compound layers between the electrode layers 131 and 141 including the fired copper and conductive resin layers 134 and 144 to be described later, there is a risk that sufficient bonding force between the electrode layers and the conductive resin layers may not be obtained, and there is a risk that a sufficient effect in terms of electrical connectivity may not be obtained, such that equivalent series resistance (ESR) will increase.

According to an exemplary embodiment in the present disclosure, two layers may be formed in a form of an intermetallic compound layer between the electrode layers and the conductive resin layers, such that a sufficient bonding force between the electrode layers and the conductive resin layers, and stable electrical connectivity between the electrode layers and the conductive resin layers may be secured to decrease ESR.

In particular, by controlling the average thickness of the first intermetallic compound layers 132 and 142, a sufficient bonding force between the electrode layers and the conductive resin layers may be maintained even in a high-temperature environment such as reflow to suppress occurrence of delamination on interfaces between the electrode layers and the conductive resin layers and secure the stable electrical connectivity between the electrode layers and the conductive resin layers, thereby decreasing the ESR.

When the average thickness of the first intermetallic compound layers 132 and 142 is less than 0.5 μm, there may be a risk that the sufficient bonding force between the electrode layers and the conductive resin layers in the high-temperature environment such as the reflow may not be secured. Here, the reflow refers to a heat treatment for bonding the multilayer electronic component to a board by melting solders at the time of mounting the multilayer electronic component on the board using the solders.

On the other hand, when the average thickness of the first intermetallic compound layers 132 and 142 is greater than 2.5 μm, there may be a risk that lumping will occur in the conductive resin layers, such that electrical connectivity will be deteriorated, and the ESR will thus increase.

The second intermetallic compound layers 133 and 143 may be disposed on the first intermetallic compound layers 132 and 142, respectively, and may include $Cu_6Sn_5$.

That is, $Cu_6Sn_5$ may be formed by bonding Cu particles, which are the metal particles included in the electrode layers 131 and 141, and Sn particles, which are the low melting point metal particles included in the paste used for forming the conductive resin layers 134 and 144, to each other.

$Cu_6Sn_5$ may serve to improve a mechanical bonding force and electrical connectivity between the first intermetallic compound layers 132 and 142 and the conductive resin layers 134 and 144.

In an exemplary embodiment, an average thickness of the second intermetallic compound layers may be 0.3 to 0.67 μm.

In an exemplary embodiment, t1/t2 may be greater than 1.5 and less than 4.5 in which t1 is the average thickness of the first intermetallic compound layers and t2 is the average thickness of the second intermetallic compound layers.

When t1/t2 is 1.5 or less, there may be a risk that a sufficient bonding force between the electrode layers and the conductive resin layers in the high-temperature environment such as the reflow may not be secured, and when t1/t2 is 4.5 or more, there may be a risk that Sn lumping in the conductive resin layers will occur due to excessive supply of Sn.

In an exemplary embodiment in the present disclosure, the second intermetallic compound layers 133 and 143 including $Cu_6Sn_5$ may be formed on the first intermetallic compound layers 132 and 142, respectively, by forming the conductive resin layers 134 and 144 using a conductive paste of an Ag—Sn-based epoxy resin rather than a conductive paste of a Cu—Sn-based epoxy resin according to the related art.

In addition, the second intermetallic compound layers 133 and 143 including $Cu_6Sn_5$ may be formed on the first intermetallic compound layers 132 and 142, respectively, by forming the conductive resin layers 134 and 144 using the conductive paste of the Ag—Sn-based epoxy resin and adjusting an amount of Sn solder, and average thicknesses of and a ratio between the first intermetallic compound layers 132 and 142 and the second intermetallic compound layers 133 and 143 may be adjusted.

FIG. 6 is an image, captured by an SEM, of a cross section in the vicinity of region B in the multilayer electronic component according to an exemplary embodiment in the present disclosure. Referring to FIG. 6, it may be confirmed that the second intermetallic compound layer 133 is formed on the first intermetallic compound layer 132.

Figure 7:
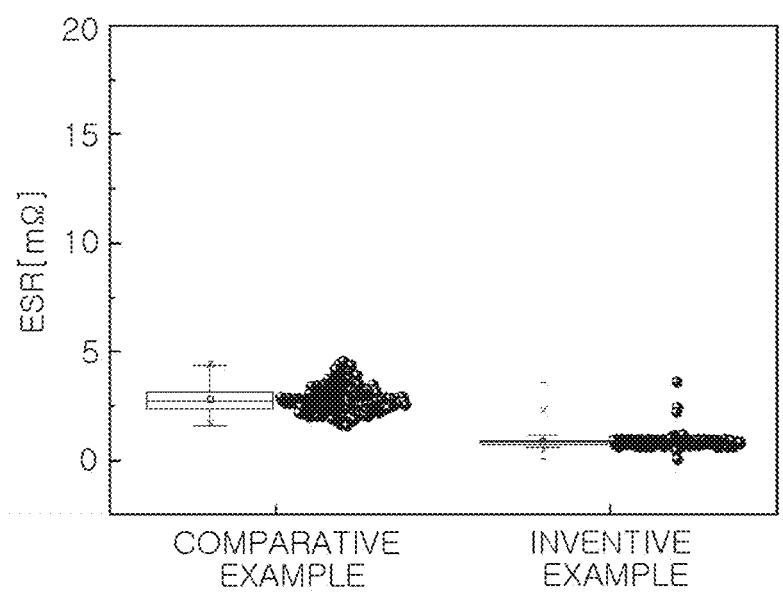
FIG. 7 is a graph for comparing equivalent series resistances (ESRs) of Comparative Example and Inventive Example with each other.

FIG. 7 is a graph for comparing ESRs of Comparative Example and Inventive Example with each other; Comparative Example of FIG. 7 is a case in which a conductive resin layer is formed using a conductive paste of a Cu—Sn-based epoxy resin according to the related art, while Inventive Example of FIG. 7 is a case in which a conductive resin layer is formed using a conductive paste of an Ag—Sn-based epoxy resin. Referring to FIG. 7, it may be seen that an ESR value is significantly lower in Inventive Example than Comparative Example.

Figure 8:
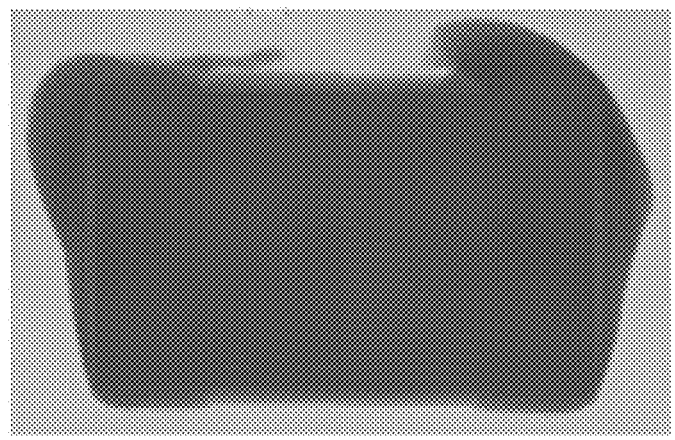
FIG. 8 is an image, captured by X-rays, of Inventive Example after reflow.
Figure 9:
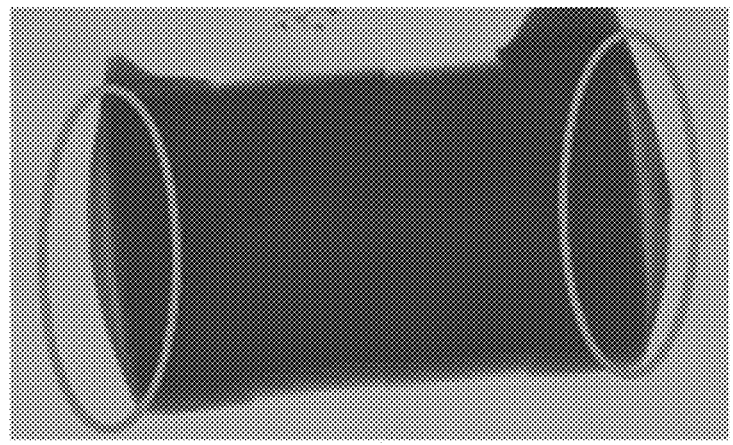
FIG. 9 is an image, captured by X-rays, of Comparative Example after reflow.

FIG. 8 is an image, captured by X-rays, of the entire multilayer electronic component of Inventive Example after reflow; and FIG. 9 is an image, captured by X-rays, of the entire multilayer electronic component of Comparative Example after reflow. It may be confirmed that in Inventive Example, delamination of an electrode layer and a conductive resin layer was hardly observed, while in Comparative Example, referring to a bright line in a circle mark, delamination of an electrode layer and a conductive resin layer was severe.

The conductive resin layers 134 and 144 may be disposed on the second intermetallic compound layers 133 and 143, respectively, and may include: the conductive connection portion 134b including the low melting point metal; the plurality of metal particles 134a; and the base resin 134c.

The conductive resin layers 134 and 144 may serve to electrically and mechanically bond the first intermetallic compound layers 132 and 142 and the second intermetallic compound layers 133 and 143 to first plating layers 135 and 145, respectively, and serve to absorb tensile stress generated in a mechanical or thermal environment at the time of mounting a multilayer electronic component on a board to prevent occurrence of cracks and protect the multilayer electronic component from a warpage impact of the board.

The low melting point metal included in the conductive connection portion 134b may be melted during drying and curing processes, and may surround the metal particles 134a. Therefore, the conductive connection portion 134b may be disposed to surround one or more of the plurality of metal particles 134a. Accordingly, stress in the body 110 may be significantly reduced, and electrical connectivity may be improved.

Here, the low melting point metal may have a melting point of 300° C. or less.

For example, the low melting point metal may include Sn having a melting point of 213° C. to 220° C. Sn may be melted during the drying and curing processes, and the molten Sn may wet metal particles having a higher melting point than the low melting point metal, such as Ag by a capillary phenomenon and react with the metal particles to form an intermetallic compound.

In an exemplary embodiment, the plurality of metal particles 134a may be silver (Ag) particles, and the low melting point metal included in the conductive connection portion 134b may be tin (Sn).

Therefore, the conductive connection portion 134b may include $Ag_3Sn$, which is an intermetallic compound between silver (Ag) and tin (Sn). $Ag_3Sn$ may serve to improve electrical connectivity through a continuous connection with the first and second intermetallic compound layers and stably implement low ESR.

The base resin 134c may include a thermosetting resin having an electrical insulating property.

In this case, the thermosetting resin may be, for example, an epoxy resin. However, the thermosetting resin according to the present disclosure is not limited thereto.

The base resin 134c may serve to mechanically bond the first intermetallic compound layers 132 and 142 and the second intermetallic compound layers 133 and 143 to the first plating layers 135 and 145.

In an exemplary embodiment, the electrode layer may include a conductive metal and glass. That is, the electrode layer may be a fired electrode.

In this case, the glass included in the electrode layer may be at least partially disposed on an outer surface of the electrode layer, and the first intermetallic compound layer may not be disposed on a portion of the outer surface of the electrode layer where the glass is disposed.

Therefore, the first intermetallic compound layer may be discontinuously disposed.

Referring to FIG. 6, it may be confirmed that the first intermetallic compound layer 132 is not disposed on a portion of the outer surface of the electrode layer where the glass G is disposed, and it may be confirmed that the first intermetallic compound layer 132 is discontinuously disposed.

In an exemplary embodiment, the external electrodes 130 and 140 may include first plating layers 135 and 145, disposed on the conductive resin layers 134 and 144, respectively, and second plating layers 136 and 146 disposed on the first plating layers 135 and 145, respectively.

The plating layers 135, 136, 145, and 146 may serve to improve mounting characteristics of the multilayer electronic component. A type of the plating layers 135, 136, 145, and 146 is not particularly limited. That is, each of the plating layers 135, 136, 145, and 146 may be a plating layer including one or more of Ni, Sn, Pd, and alloys thereof, and may be formed as a plurality of layers.

For example, the plating layers 135, 136, 145, and 146 may include Ni plating layers 135 and 145 disposed on the conductive resin layers 134 and 144, respectively, and Sn plating layers 136 and 146 disposed on the Ni plating layers, respectively.

In this case, the conductive connection portions 134b and 144b may serve to connect the plating layers and the second intermetallic compound layers to each other, respectively.

A method of manufacturing a multilayer electronic component according to an exemplary embodiment in the present disclosure will hereinafter be described in detail, but the present disclosure is not limited thereto, and a description for contents overlapping the contents of the multilayer electronic component described above in a description for a method of manufacturing a multilayer electronic component according to the present exemplary embodiment will be omitted.

In the method of manufacturing a multilayer electronic component according to the present exemplary embodiment, a plurality of ceramic green sheets may be first prepared by applying a slurry including powder particles such as barium titanate ($BaTiO_3$) powder particles to carrier films and then drying the slurry applied to the carrier films.

The ceramic green sheet may be prepared by mixing ceramic powder particles, a binder, and a solvent with each other to prepare a slurry and manufacturing the slurry in a sheet shape having a thickness of several micrometers by a doctor blade method.

Then, a conductive paste for an internal electrode, including a conductive metal such as nickel powder particles may be applied to the ceramic green sheet by a screen-printing method, or the like, to form the internal electrode.

Next, a plurality of ceramic green sheets on which the internal electrodes are printed may be stacked to prepare a laminate. In this case, a plurality of layers of ceramic green sheets on which the internal electrodes are not printed may be stacked on upper and lower surfaces of the laminate to form covers.

Next, the laminate may be sintered to prepare a body, and electrode layers may then be formed on the third and fourth surfaces of the body, respectively, so as to be electrically connected to the first and second internal electrodes, respectively.

The body may include the dielectric layers, the internal electrodes, and the covers, the dielectric layers may be formed by sintering the ceramic green sheets on which the internal electrodes are printed, and the covers may be formed by sintering the ceramic green sheets on which the internal electrodes are not printed.

The internal electrodes may include the first and second internal electrodes having different polarities.

Next, the electrode layers may be formed on one side and the other side of the body.

The electrode layers may be formed by applying a conductive paste for forming external electrodes including copper, which is a conductive metal, and glass to one surface and the other surface of the body.

The electrode layers may be formed by a dipping method, and is not limited thereto, and the electrode layers may also be formed by a method of transferring a sheet, an electroless plating method, or a sputtering method.

Next, a low melting point paste including a plurality of metal particles, a base resin, and a low melting point metal may be applied, dried, cured, and then heat-treated onto the electrode layers to form the first intermetallic compound layers formed of a first intermetallic compound, the second intermetallic compound layers disposed on first intermetallic compound layers and formed of a second intermetallic compound, and the conductive resin layers.

For example, the low melting point paste may be prepared by mixing Ag powder particles, Sn-based solder powder particles, and a thermosetting resin with each other, and then dispersing the mixture using a 3-roll mill. The Sn-based solder powder particles may include at least one selected from the group consisting of Sn, $Sn_{96.5}Ag_{3.0}Cu_{0.5}$, $Sn_{42}Bi_{58}$, and $Sn_{72}Bi_{28}$, and a particle size of Ag included in the Ag powder particles may be 0.5 to 3 μm, but is not limited thereto.

In addition, the low melting point paste may be applied, dried, and cured to outer surfaces of the electrode layers to form the first and second intermetallic compound layers and the conductive resin layers.

The thermosetting resin may include, for example, an epoxy resin. However, the thermosetting resin according to the present disclosure is not limited thereto, and may be, for example, a bisphenol A resin, a glycol epoxy resin, a novolak epoxy resin, or a resin that is in a liquid state at room temperature due to a small molecular weight among derivatives thereof.

Further, the first plating layers and the second plating layers may be further formed on the conductive resin layers.

For example, nickel plating layers, which are the first plating layers, may be formed on the conductive resin layers, and tin plating layers, which are the second plating layers, may be formed on the nickel plating layers.

INVENTIVE EXAMPLE

After forming a conductive resin layer on a Cu fired electrode layer using a conductive paste in which Ag powder particles, Sn-based solder powder particles, and a thermosetting resin were mixed with each other, while changing a supply amount of the Sn-based solder powder particles, average thicknesses t1 and t2 of first and second intermetallic compound layers between the Cu fired electrode layer and the conductive resin layer, a degree of formation of an intermetallic compound (IMC) in the conductive resin layer, whether or not delamination has occurred after reflow, and average ESR were measured and shown in Table 1.

The supply amount of the Sn-based solder powder particles was changed by 10 wt % on the basis of Test No. 2.

On the basis of production of a conductive resin layer including a total of 100 g of metal, contents of Cu and Ag were fixed, and a supply amount of Sn was then adjusted.

After capturing an image of a cross section of the body cut in the first and second directions at the center of the body in the third direction by an SEM, thicknesses of each of the first and second intermetallic compound layers were measured at any ten points in a region of 20 μm at the center in the first direction using size measurement software built into the SEM, and averages of the measured thicknesses were shown as t1 and t2 in Table 1.

In addition, it was confirmed that the first and second intermetallic compound layers were $Cu_3Sn$ and $Cu_6Sn_5$ layers, respectively, and it was confirmed that $Ag_3Sn$ was included in the conductive resin layer and a degree of formation of $Ag_3Sn$ was confirmed, by using a scanning electron microscope-energy dispersive X-ray spectroscopy (SEM-EDS) equipment.

The degree of formation of the intermetallic compound (IMC) in the conductive resin layer was expressed as "O" in a case in which atom % (At %) of Ag:Sn was within ±5% of 3:1 in the same manner as a case in which At % of Cu:Sn is within ±5% of 6:5 at the time of measuring components at positions of ten points or more with the SEM-EDS equipment. On the other hand, the degree of formation of the intermetallic compound (IMC) in the conductive resin layer was expressed as "Δ" in a case in which At % of Ag:Sn exceeds ±5% of 3:1 and is within ±15% of 3:1, and was expressed as lumping particularly in a case in which a content of Sn is +10% or more, at the time of measuring the components in the same measuring manner. The degree of formation of the intermetallic compound (IMC) in the conductive resin layer was expressed as X in a case in which Ag:Sn is outside of the ranges described above.

Whether or not the delamination has occurred was expressed as Large in a case in which the number of samples in which delamination has occurred is 70 or more and was expressed as Small in a case in which the number of samples in which delamination has occurred is less than 30 and is 10 or more, as a result of mounting hundred samples per Test No. on a board through a reflow heat treatment and then capturing images of the hundred samples by X-rays.

TABLE 1

| Test No. | Supply Amount of Solder Powder particles | t1 (μm) | t2 (μm) | t1/t2 | Degree of Formation of IMC in Conductive Resin Layer | Whether or Not Delamination Has Occurred | Average ESR (mOhm) |
|---|---|---|---|---|---|---|---|
| 1* | −10% | 0.1 | 0.1 | 1.00 | X | Large | 6.3 |
| 2* | −0% | 0.3 | 0.2 | 1.50 | Δ | Small | 4.1 |
| 3 | +10% | 1.2 | 0.6 | 2.00 | O | None | 2.6 |
| 4 | +20% | 2 | 0.65 | 3.08 | O | None | 2.35 |
| 5 | +30% | 2.2 | 0.65 | 3.38 | O | None | 2.5 |
| 6 | +40% | 3.1 | 0.68 | 4.56 | Δ (Lumping) | None | 2.9 |

In Test Nos. 1 and 2, it was confirmed that t1 was less than 0.5 μm, such that it was difficult to suppress occurrence of the delamination, and average ESR was also high, such that electrical connectivity was poor.

In Test Nos. 3 to 5, it was confirmed that t1 was 0.5 to 2.5 μm, such that occurrence of the delamination was suppressed, and it was confirmed that average ESR was also low, such that electrical connectivity was excellent.

On the other hand, in Test No. 6, it was confirmed that t1 is greater than 2.5 μm, such that the delamination did not occur, but lumping occurred in the conductive resin layer, $Ag_3Sn$ and $Cu_6Sn_5$ were not sufficiently formed, and electrical connectivity was not secured, such that ESR was increased.

As set forth above, according to an exemplary embodiment in the present disclosure, reliability of the multilayer electronic component may be improved.

In addition, the ESR of the multilayer electronic component may be decreased.

Further, the occurrence of the delamination on the interfaces between fired electrode layers and the conductive resin layers due to the outgas generated in the conductive resin layers in the high-temperature environment such as the reflow may be suppressed.

While exemplary embodiments have been shown and described above, it will be apparent to those skilled in the art that modifications and variations could be made without departing from the scope of the present invention as defined by the appended claims.

What is claimed is:

1. A multilayer electronic component comprising:
 a body including dielectric layers and internal electrodes disposed alternately with the dielectric layers; and
 external electrodes disposed on the body,
 wherein each of the external electrodes includes:
 an electrode layer connected to the internal electrodes;
 a first intermetallic compound layer disposed on the electrode layer and including $Cu_3Sn$;

a second intermetallic compound layer disposed on the first intermetallic compound layer and including $Cu_6Sn_5$; and a conductive resin layer disposed on the second intermetallic compound layer and including: a conductive connection portion including a low melting point metal; a plurality of metal particles; and a base resin, and $t1/t2$ is greater than 1.5 and less than 4.5 in which $t1$ is an average thickness of the first intermetallic compound layer and $t2$ is an average thickness of the second intermetallic compound layer.

2. The multilayer electronic component of claim 1, wherein an average thickness of the second intermetallic compound layer is 0.3 to 0.67 μm.

3. The multilayer electronic component of claim 1, wherein the conductive connection portion is disposed to surround one or more of the plurality of metal particles.

4. The multilayer electronic component of claim 3, wherein the low melting point metal included in the conductive connection portion is disposed to surround one or more of the plurality of metal particles.

5. The multilayer electronic component of claim 1, wherein the plurality of metal particles includes silver (Ag) particles, and the low melting point metal includes tin (Sn).

6. The multilayer electronic component of claim 1, wherein the conductive connection portion includes $Ag_3Sn$.

7. The multilayer electronic component of claim 1, wherein the electrode layer includes a conductive metal and glass.

8. The multilayer electronic component of claim 7, wherein the first intermetallic compound layer is not disposed on a portion of an outer surface of the electrode layer where the glass is disposed.

9. The multilayer electronic component of claim 1, wherein the first intermetallic compound layer is discontinuously disposed on the electrode layer.

10. The multilayer electronic component of claim 1, wherein the external electrodes includes a plating layer disposed on the conductive resin layer.

11. The multilayer electronic component of claim 10, wherein the conductive connection portion connects the plating layer and the second intermetallic compound layer to each other.

12. The multilayer electronic component of claim 1, wherein the low melting point metal has a melting point of 300° C. or less.

13. The multilayer electronic component of claim 1, wherein the average thickness of the first intermetallic compound layer is 0.5 to 2.5 μm.

14. The multilayer electronic component of claim 13, wherein the plurality of metal particles includes silver (Ag) particles, and the low melting point metal includes tin (Sn).

15. A multilayer electronic component comprising:
a body including dielectric layers and internal electrodes disposed alternately with the dielectric layers; and
external electrodes disposed on the body,
wherein each of the external electrodes includes:
an electrode layer connected to the internal electrodes;
a first intermetallic compound layer disposed on the electrode layer and including $Cu_3Sn$;
a second intermetallic compound layer disposed on the first intermetallic compound layer and including $Cu_6Sn_5$; and
a conductive resin layer disposed on the second intermetallic compound layer and including: a conductive connection portion including a low melting point metal; a plurality of metal particles; and a base resin;
an average thickness of the first intermetallic compound layer is 0.5 to 2.5 μm; and
an average thickness of the second intermetallic compound layer is 0.3 to 0.67 μm.

16. The multilayer electronic component of claim 15, wherein the conductive connection portion is disposed to surround one or more of the plurality of metal particles.

17. The multilayer electronic component of claim 15, wherein the conductive connection portion includes $Ag_3Sn$.

18. The multilayer electronic component of claim 15, wherein the electrode layer includes a conductive metal and glass.

19. A multilayer electronic component comprising:
a body including dielectric layers and internal electrodes disposed alternately with the dielectric layers; and
external electrodes disposed on the body,
wherein each of the external electrodes includes:
an electrode layer connected to the internal electrodes;
a first intermetallic compound layer disposed on the electrode layer and including $Cu_3Sn$;
a second intermetallic compound layer disposed on the first intermetallic compound layer and including $Cu_6Sn_5$; and
a conductive resin layer disposed on the second intermetallic compound layer and including: a conductive connection portion including a low melting point metal; a plurality of metal particles; and a base resin,
an average thickness of the first intermetallic compound layer is 0.5 to 2.5 μm.

20. The multilayer electronic component of claim 19, wherein the average thickness of the first intermetallic compound layer is 1.2 to 2.2 μm.

* * * * *